United States Patent [19]

Satomi

[11] Patent Number: 4,663,577
[45] Date of Patent: May 5, 1987

[54] DRIVING CIRCUIT FOR MULTI-PHASE STEPPING MOTOR

[75] Inventor: Hirofumi Satomi, Kashiwa, Japan

[73] Assignee: Oriental Motor Co., Ltd., Tokyo, Japan

[21] Appl. No.: 796,620

[22] Filed: Nov. 8, 1985

[30] Foreign Application Priority Data

Dec. 22, 1984 [JP] Japan .............................. 59-271317

[51] Int. Cl.$^4$ ............................................. H02P 8/00
[52] U.S. Cl. .................................... 318/696; 318/685
[58] Field of Search ............................... 318/696, 685

[56] References Cited

U.S. PATENT DOCUMENTS

| 3,866,104 | 2/1975 | Heine ................................. 318/696 |
| 4,000,452 | 12/1976 | Heine ................................. 318/696 |
| 4,095,161 | 6/1978 | Heine et al. ......................... 318/696 |

Primary Examiner—William M. Shoop, Jr.
Assistant Examiner—Saul M. Bergmann
Attorney, Agent, or Firm—Toren, McGeady and Goldberg

[57] ABSTRACT

A driving circuit for a multi-phase stepping motor including an odd number of phase windings which are sequentially connected in series to each other so that a starting end of one winding is connected to a terminating end of an adjacent winding to form an annular connection, comprises switching means each connected to a junction between two adjacent windings, and each junction is connected to a positive pole or a negative pole of a drive power source through the switching means or is not connected to any sides of the power source by means of each switching means. The switching means are alternately and repeatedly controlled so that the total number of the junctions connected to the positive pole or the negative pole of the power source when the motor is driven is two or three, or the switching means are controlled so that two or three junctions are alternately and repeatedly connected to the positive pole or the negative pole of the power source each time an input pulse is supplied. When the switching means for driving the windings of the multi-phase stepping motor are composed of two switching elements at a minimum per one phase, a desired half-step drive operation can be exactly attained. Accordingly, a circuit configuration thereof can be greatly simplified and a capacity of the drive power source can be reduced to substantially twice a rated current of the windings since the winding for each phase is connected in series or in parallel with the power source.

2 Claims, 9 Drawing Figures

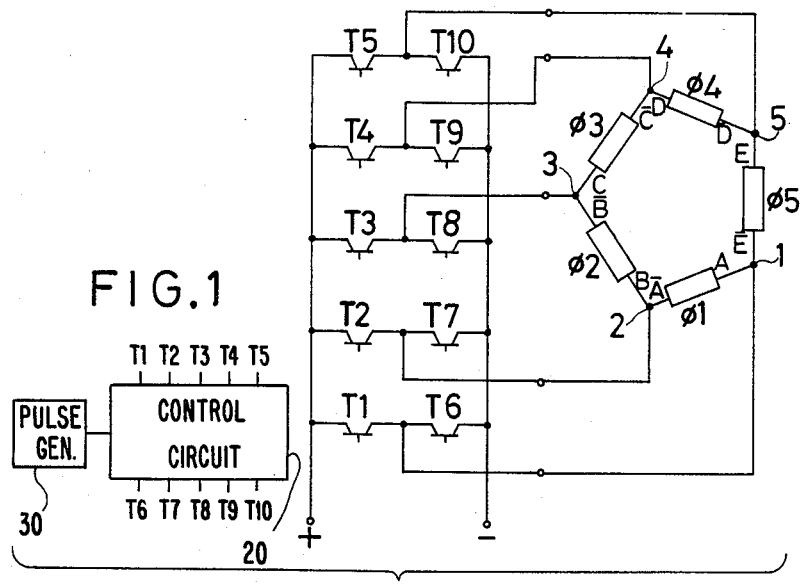
FIG.1
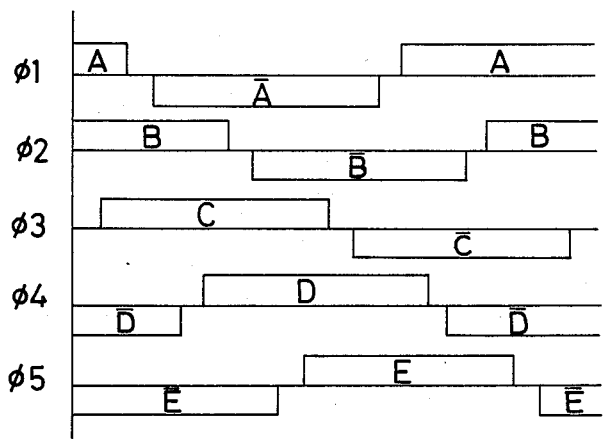
FIG.2
FIG.3

FIG. 6
| STEP | 1 | 2 | 3 | 4 | 5 | 6 | 7 | 8 | 9 | 10 | 11 | 12 | 13 | 14 | 15 | 16 | 17 | 18 | 19 | 20 | 1 |
|---|---|---|---|---|---|---|---|---|---|---|---|---|---|---|---|---|---|---|---|---|---|
| T1  | o | o |   |   |   |   |   |   |   |    |    |    |    | o  | o  | o  | o  | o  | o  | o  |   |
| T2  | o | o | o | o | o | o |   |   |   |    |    |    |    |    |    |    | o  | o  | o  | o  |   |
| T3  |   | o | o | o | o | o | o | o |   |    |    |    |    |    |    |    |    |    |    |    |   |
| T4  |   |   |   |   | o | o | o | o | o | o  | o  | o  |    |    |    |    |    |    |    |    |   |
| T5  |   |   |   |   |   |   |   | o | o | o  | o  | o  | o  | o  | o  |    |    |    |    |    |   |
| T6  |   | o | o | o | o | o | o | o | o | o  |    |    |    |    |    |    |    |    |    |    |   |
| T7  |   |   |   |   |   | o | o | o | o | o  | o  | o  |    |    |    |    |    |    |    |    |   |
| T8  |   |   |   |   |   |   |   |   | o | o  | o  | o  | o  | o  | o  | o  |    |    |    |    |   |
| T9  | o | o | o | o |   |   |   |   |   |    |    |    |    |    |    | o  | o  | o  | o  | o  | o |
| T10 | o | o | o | o | o | o | o |   |   |    |    |    |    |    |    |    |    |    | o  | o  |   |
FIG. 7
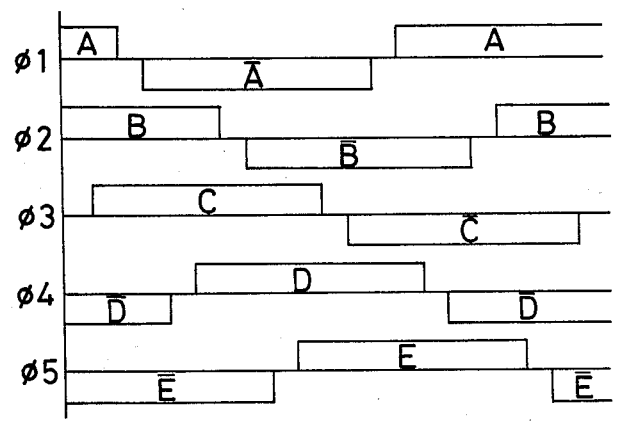
FIG. 9 (PRIOR ART)
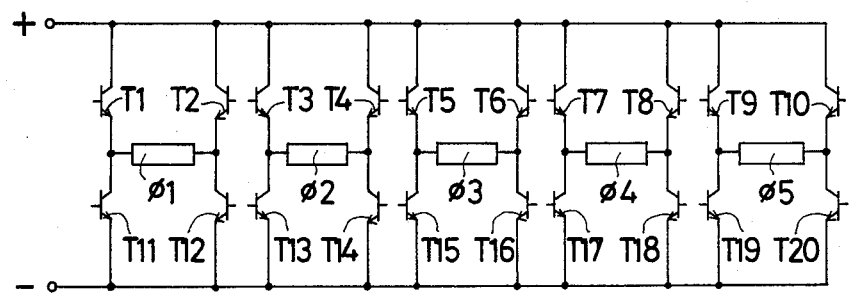

DRIVING CIRCUIT FOR MULTI-PHASE STEPPING MOTOR

BACKGROUND OF THE INVENTION (i) Field of the Invention

The present invention relates to a multi-phase stepping motor, and more particularly to a driving circuit for a multi-phase stepping motor in which the half-step drive operation is attained.

(ii) Description of the Related Art

Various driving means for such a multi-phase stepping motor have been proposed heretofore. U.S. Pat. No. 3,599,069, for example, discloses a multi-phase stepping motor which includes switching means each connected to windings of stators and a control circuit for controlling the switching means so that each of the windings takes any one of the three states so that the corresponding winding is excited to be one polarity or to be the other polarity or is not excited to any polarity forming a short circuit of the winding in accordance with a predetermined sequence so as to advance the motor in a predetermined direction by a predetermined step angle by means of a magnetic field produced in each of the windings. With such control means, while the circuit configuration is complicated, the dumping characteristic of the motor is maintained to satisfactory.

FIG. 9 shows another circuit configuration of drive means for the multi-phase stepping motor in which many switching elements are required but the circuit configuration is simplified. The circuit of FIG. 9 includes switching elements T1 to T10, for connecting each of starting ends and terminating ends of phase windings $\phi 1$ to $\phi 5$ of the multi-phase stepping motor to the positive pole of a D.C. power source, and switching elements T11 to T20, for connecting each of starting ends and terminating ends of phase windings $\phi 1$ to $\phi 5$ to the negative pole of the source. When half-step drive operation, for example, is performed in the circuit of FIG. 9, so-called four-phase and five-phase excitations are attained by alternately repeating one state capable of energizing four phase windings and another state capable of energizing five phase windings, each time an input pulse is supplied.

In the above prior art drive system, the circuit configuration is generally complicated and particularly if the half-step drive operation is desired in such a multi-phase stepping motor, many switching elements, for example, four times as many switching elements as the number of the phases of the motor are required. Accordingly, the circuit configuration in an output stage is also complicated and a required current capacity of the power source is four to five times or more as large as a rated current value of the windings. Further, the number of connecting wires between the motor and the driving circuit increases and hence the operation for the wire connection is complicated and troublesome. Thus, the realization of the half-step drive operation in the multi-phase stepping motor has various defects in practice.

SUMMARY OF THE INVENTION

The present invention has been made in view of the above defects and one object of the present invention is to provide a driving circuit for a multi-phase stepping motor in which the number of switching elements required for forming the driving circuit, is decreased to a minimum to simplify the circuit configuration and reduce the wire connection operation.

Another object of the present invention is to provide a driving circuit for a multi-phase stepping motor in which the current capacity of the power source for the drive circuit is about twice the rated current of the windings and which is sufficiently practical.

In order to achieve the above objects, the driving circuit for the multi-phase stepping motor according to the present invention is constructed as follows.

(I) A driving circuit for a multi-phase stepping motor including an odd number of phase windings which are sequentially connected in series to each other so that a starting end of one winding is connected to a terminating end of an adjacent winding to form an angular connection and junctions between the windings are connected to switching means through which each junction is connected to a positive pole or a negative pole of a drive power source or is not connected to any poles of the power source, is characterized in that the switching means are alternately and repeatedly controlled so that the total number of the junctions connected to the positive pole or the negative pole of said power source when the motor is driven is two or three, or the switching means are controlled so that two and three junctions are alternately and repeatedly connected to the positive pole or the negative pole of the power source each time an input pulse is supplied.

(II) A driving circuit for a multi-phase stepping motor, including an odd number n of phase windings of which starting ends or terminating ends are connected to each other and terminating ends or starting ends are connected to switching means so that the windings are connected to a positive pole or a negative pole of a drive power source through the switching means or is not connected to any poles of the power source, is characterized in that the switching means are alternately and repeatedly controlled so that the total number of the junctions connected to the positive pole or the negative pole of said power source is $(n-1)/2$ or $(n+1)/2$ when the motor is driven, or the switching means are controlled so that $(n-1)/2$ and $(n+1)/2$ windings are alternately and repeatedly connected to the positive pole or the negative pole of the power source, each time an input pulse is supplied.

Since the present invention is constructed as above, the present invention possesses the following effects.

(I) The switching means for driving the phase windings of the multi-phase stepping motor is composed of two elements, at a minimum, per one phase, and a desired half-step drive operation is exactly attained. Hence, the circuit configuration can be greatly simplified. The simplification of the circuit configuration minimizes the number of wiring leads of the motor and hence reduces the wire connecting operation to the driving circuit.

(II) Since the phase windings of the multi-phase stepping motor are connected in series or in parallel with the drive power source, the capacity of the power source can be reduced to about twice the rated current for the windings.

(III) According to the driving circuit of the present invention, the variation of torque in the four-phase and five-phase excitation, when driving with a constant current or when driving with a constant voltage, can be suppressed to a small value which does not produce any trouble, that is, about 5%. Accordingly, it is optimum to reduce the cost of this type of motor and the driving circuit and to improve the practicability thereof.

BRIEF DESCRIPTION OF THE DRAWINGS

FIG. 1 is a circuit diagram of a driving circuit for a multi-phase stepping motor according to one embodiment of the present invention;

FIG. 2 is a timing chart showing conducting states of switching elements for each step in the circuit of FIG. 1;

FIG. 3 is a timing chart showing excitation states of phase windings in correspondence with FIG. 2;

FIG. 6 is a timing chart showing conducting states of switching elements for each step in the circuit of FIG. 5;

FIG. 7 is a timing chart showing excitation states of phase windings in FIG. 6;

FIG. 9 is a circuit diagram of a driving circuit for a five-phase stepping motor in which a half-step drive operation is attained in accordance with prior art means.

DETAILED DESCRIPTION OF PREFERRED EMBODIMENTS

Figure 4:
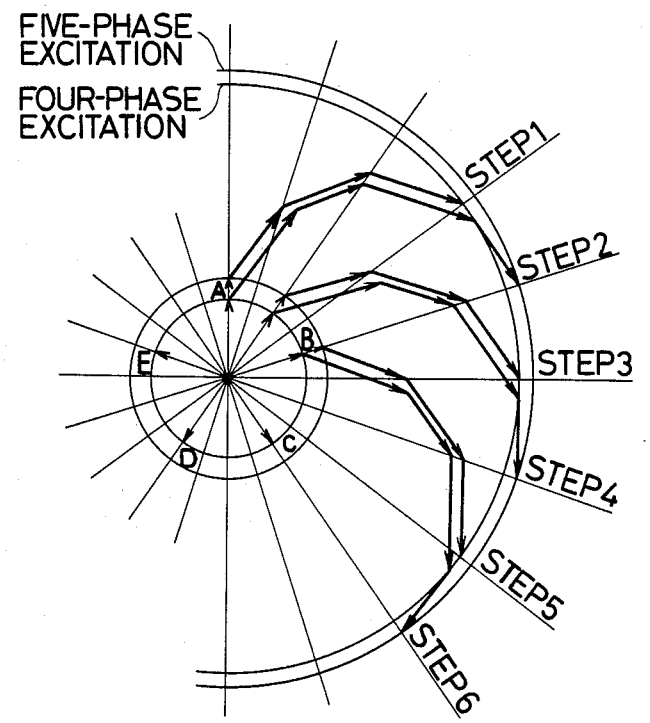
FIG. 4 is a vector diagram of a composite torque when the motor is driven by the driving circuit of FIG. 1 with a constant current.

FIG. 1 shows one embodiment of a driving circuit for a multi-phase stepping motor according to the present invention. In FIG. 1, $\phi1$–$\phi5$ denote phase windings for five phases which are connected to each other through junctions 1–5. Each starting end of the phase windings is connected to each terminating end of the adjacent windings in sequence to form an annular connection so that the phase windings can form vectors A, B, C, D and E each shifting from each other by 72° of an electric angle when an annular current flows. T1–T5 and T6–T10 denote switching elements for connecting the windings, through junctions 1–5, to the positive pole and the negative pole of a drive power source. As shown in the figure, the switching elements T1 and T6, T2 and T7, T3 and T8, T4 and T9, and T5 and T10 are connected in series to each other and each junction between each pair of switching elements is connected to the correponding junction between the windings. A control circuit 20 is also shown and is connected to each of the switching elements T1–T10, for selectively activating the switching elements T1–T10, in response to input pulses from pulse generator 30.

FIGS. 2 and 3 are timing charts showing the operation of the driving circuit constructed as above. In the figures, in step 1, upon receipt of an input pulse from pulse generator 30, the switching elements T1, T8 and T9 are turned on by the control circuit 20 so that the junction 1, between the windings $\phi1$, and $\phi5$, is connected to the positive pole of the power source and the junction 3, between the windings $\phi2$ and $\phi3$, and the junction 4, between the windings $\phi3$ and $\phi4$, are connected to the negative pole of the power source so that a so-called four-phase excitation state is formed. Then, when proceeding to step 2 at a following input pulse, since the switching element T8 is turned off and the switching elements T1 and T9 are maintained on by the control circuit 20, the junction 1 is connected to the positive pole of the power source and the junction 4 is connected to the negative pole of the power source so that a so-called five-phase excitation state is formed. Further, in step 3, since the switching elements T1, T2 and T9 are on by the control circuit 20, the junctions 1 and 2 are connected to the positive pole of the power source and the junction 4 is connected to the negative pole of the power source so that the four-phase excitation state is again formed. In the same manner, in steps 4–20, the four-phase excitation state and the five-phase excitation state are alternately repeated in sequence. Accordingly, the total number of the junctions connected to the positive pole and the negative pole of the power source is two or three, and the two-junction connection and the three-junction connection are alternately repeated to be 3→2→3→2 ...

FIG. 4 shows a diagram of vectors produced by the drive circuit as constructed above. As seen from the figure, the vector of the composite torque for each step is rotated by 18° so that a so-called half-step drive operation is attained.

Figure 5:
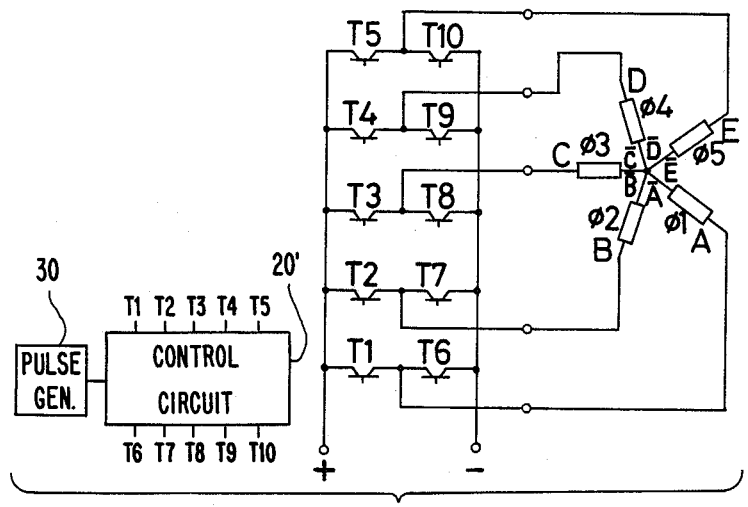
FIG. 5 is a circuit diagram of a driving circuit for a multi-phase stepping motor according to another embodiment of the present invention.

FIG. 5 shows another circuit connection of the phase windings $\phi1$–$\phi5$, in which each end of the windings is connected to each other at one junction so that vectors A, B, C, D and E, shifted by 72° of an electric angle, are produced when current flows into the junction. Other ends of the windings are connected to the corresponding junctions between the series-connected switching elements T1–T10 in the same manner. These switching elements are controlled by a control circuit 20' to which input pulses are applied from the pulse generator 30.

As apparent from the timing charts of FIGS. 6 and 7, in the driving circuit as constructed above, in step 1, the switching elements T1, T2, T9 and T10 are turned on by the control circuit 20' so that the windings $\phi1$ and $\phi2$ are connected to the positive pole of the power source and the windings $\phi4$ and $\phi5$ are connected to the negative pole of the power source, so that the four-phase excitation state is formed. Then, in step 2, the switching elements T1, T2, T3, T9 and T10 are turned on by the control circuit 20' so that the windings $\phi1$, $\phi2$ and $\phi3$ are connected to the positive pole of the power source and the windings $\phi4$ and $\phi5$ are connected to the negative pole of the power source, so that the five-phase excitation state is formed. Further, in step 3, the switching elements T2, T3, T9 and T10 are turned on by the control circuit 20'. Accordingly, the windings $\phi2$ and $\phi3$ are connected to the positive pole of the power source and the windings $\phi4$ and $\phi5$ are connected to the negative pole of the power source so that the four-phase excitation state is again formed. In this manner, in step 4 et seq., the four-phase and five-phase excitation states are alternately repeated in sequence.

Accordingly, the number of the terminals connected to the positive pole or the negative pole of the power source is two or three, that is, the two-connection and three-connection are alternately repeated. Generally, when the multi-phase stepping motor includes an odd number n of phases, the number of terminals connected to the respective poles of the power source is $(n-1)/2$ or $(n+1)/2$, that is, the $(n-1)/2$-connection and the $(n+1)/2$-connection are alternately repeated.

Figure 8:
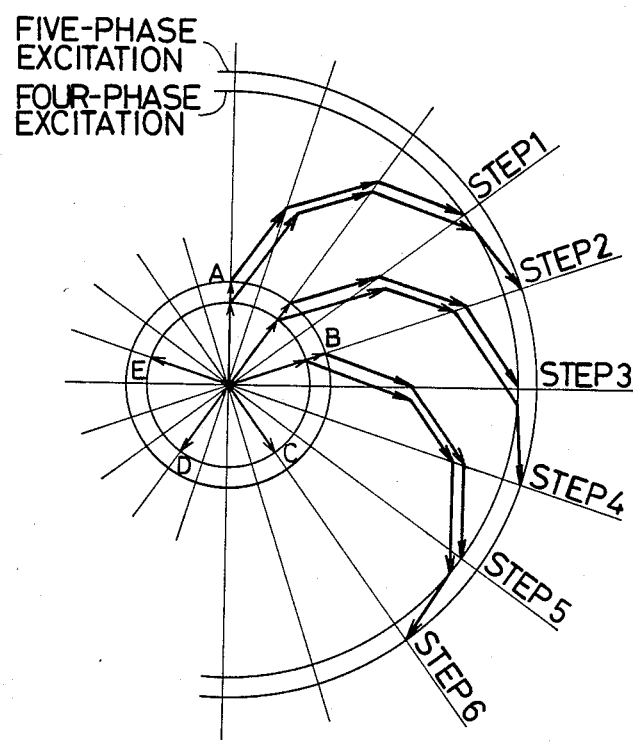
FIG. 8 is a vector diagram of a composite torque when the motor is driven by the driving circuit of FIG. 8 with a constant voltage.

As is apparent from FIG. 8 showing a diagram of vectors produced in the driving circuit of FIG. 5, the vectors of the composite torque are rotated by 18° and the so-called half-step drive operation can be attained.

While not shown, it is properly possible in the present invention, to provide switching means capable of switching from the circuit of FIG. 1 to that of FIG. 5 if necessary. The present invention may be applicable to any multi-phase stepping motor other than the five-phase stepping motor as shown in the embodiments.

While the typical preferred embodiments of the present invention has been described fully hereinbefore, it is to be understood that the present invention is not intended to be restricted to the details of the specific constructions shown in the preferred embodiments, but to contrary, many changes and modifications may be made in the foregoing teachings without any restriction thereto and without departing from the spirit and scope of the invention.

I claim:

1. A driving circuit for a multi-phase stepping motor including an odd number of phase windings which are sequentially connected in series to each other so that a starting end of one winding is connected to a terminating end of an adjacent winding to form an annular connection having junctions between the windings, said driving circuit including switching means through which each junction is connected to a positive pole or a negative pole of a drive power source or is not connected to any poles of the power source, characterized in that said driving circuit further comprises a pulse generator for generating input pulses and a control circuit for controlling said switching means in response to said input pulses so that said switching means are alternately and repeatedly controlled whereby the total number of the junctions connected to the positive pole or the negative pole of said power source when the motor is driven is two or three, or whereby two and three junctions are alternately and repeatedly connected to the positive pole or the negative pole of the power source each time one of said input pulses is supplied.

2. A driving circuit for a multi-phase stepping motor, including an odd number n of phase windings of which respective one ends thereof are connected to each other, said driving circuit including switching means through which respective other ends of the windings are connected to a positive pole or a negative pole of a drive power source, or are not connected to any poles of the power source, characterized in that said driving circuit further comprises a pulse generator for generating input pulses and a control circuit for controlling said switching means in response to said input pulses so that said switching means are alternately and repeatedly controlled whereby the total number of the junctions connected to the positive pole or the negative pole of said power source is $(n-1)/2$ or $(n-1)/2$ when the motor is driven, or whereby $(n-1)/2$ and $(n+1)/2$ windings are alternately and repeatedly connected to the positive pole or the negative pole of the power source each time one of said input pulses is supplied.

* * * * *